(12) United States Patent
Ichimura et al.

(10) Patent No.: US 10,359,307 B2
(45) Date of Patent: Jul. 23, 2019

(54) LIQUID SURFACE POSITION DETECTION DEVICE

(71) Applicant: NIPPON SEIKI CO., LTD., Niigata (JP)

(72) Inventors: Masatoshi Ichimura, Niigata (JP); Hiroyuki Suzuki, Niigata (JP)

(73) Assignee: NIPPON SEIKI CO., LTD., Niigata (JP)

( * ) Notice: Subject to any disclaimer, the term of this patent is extended or adjusted under 35 U.S.C. 154(b) by 150 days.

(21) Appl. No.: 15/560,130

(22) PCT Filed: Mar. 14, 2016

(86) PCT No.: PCT/JP2016/057891
§ 371 (c)(1),
(2) Date: Sep. 20, 2017

(87) PCT Pub. No.: WO2016/158334
PCT Pub. Date: Oct. 6, 2016

(65) Prior Publication Data
US 2018/0100756 A1    Apr. 12, 2018

(30) Foreign Application Priority Data
Mar. 30, 2015   (JP) .................. 2015-068785

(51) Int. Cl.
*B06B 1/06* (2006.01)
*G01F 23/22* (2006.01)
*G01F 23/296* (2006.01)

(52) U.S. Cl.
CPC ........ *G01F 23/2968* (2013.01); *B06B 1/0644* (2013.01); *G01F 23/22* (2013.01); *G01F 23/2965* (2013.01); *G01F 23/2962* (2013.01)

(58) Field of Classification Search
CPC .. G01F 23/2968; G01F 23/22; G01F 23/2965; G01F 23/2962; B06B 1/0644
See application file for complete search history.

(56) References Cited

U.S. PATENT DOCUMENTS 2,839,915 A * 6/1958 Rich .................. G01N 11/16
73/54.25
3,394,589 A * 7/1968 Tomioka ............ G01F 23/2962
367/108

(Continued)

FOREIGN PATENT DOCUMENTS

JP     04-86525 A    3/1992
JP     09-126863 A   5/1997

(Continued)

OTHER PUBLICATIONS

International Search Report issued in corresponding International Application No. PCT/JP2016/057891, dated Apr. 7, 2016.

*Primary Examiner* — David A Rogers
(74) *Attorney, Agent, or Firm* — McDermott Will & Emery LLP

(57) ABSTRACT

A liquid-surface position detection device includes: a propagation body being disposed in a container immersed in a liquid and propagating surface waves; a vibration generation and detection means imparting vibrations to the propagation body and including a piezoelectric element detecting reflected surface waves; and a position detection means calculating the liquid surface position from the reflection time of the surface waves. The propagation body is made of a resin material and provided integrally, at the upper part thereof, with an element accommodating part which accommodates the piezoelectric element. The element accommodating part includes a bottom surface section formed so that a portion thereof juts out from a main surface forming the surface of the propagation body. The piezoelectric element (Continued)

is disposed so that a portion thereof juts out from the main surface, and to apply vibrations to the main surface in the vertical direction via the bottom surface section.

6 Claims, 5 Drawing Sheets

(56) References Cited

U.S. PATENT DOCUMENTS

| | | | | |
|---|---|---|---|---|
| 3,975,582 | A * | 8/1976 | Ford | G01F 23/242 |
| | | | | 174/153 R |
| 4,289,019 | A * | 9/1981 | Claytor | G01M 3/243 |
| | | | | 702/51 |
| 4,457,163 | A * | 7/1984 | Jackle | G01N 29/14 |
| | | | | 73/40.5 A |
| 4,646,569 | A * | 3/1987 | Cosser | G01F 23/24 |
| | | | | 307/118 |
| 5,095,748 | A * | 3/1992 | Gregory | G01F 23/2961 |
| | | | | 702/54 |
| 5,263,371 | A * | 11/1993 | Maresca, Jr. | G01F 23/2962 |
| | | | | 181/124 |
| 5,502,652 | A * | 3/1996 | Hoggatt | G01F 1/662 |
| | | | | 702/136 |
| 5,548,530 | A * | 8/1996 | Baumoel | G01M 3/243 |
| | | | | 702/48 |
| 5,708,195 | A * | 1/1998 | Kurisu | F17D 5/02 |
| | | | | 340/605 |
| 5,730,025 | A | 3/1998 | Getman et al. | |
| 5,900,546 | A * | 5/1999 | Wilkins | G01F 23/72 |
| | | | | 340/624 |
| 6,003,376 | A * | 12/1999 | Burns | G01S 3/808 |
| | | | | 73/584 |
| 6,202,484 | B1 * | 3/2001 | Willner | G01F 23/2962 |
| | | | | 73/290 V |
| 6,536,275 | B1 * | 3/2003 | Durkee | G01F 23/2962 |
| | | | | 73/290 V |
| 6,626,042 | B2 * | 9/2003 | Havlena | G01F 1/34 |
| | | | | 367/81 |
| 6,983,654 | B2 * | 1/2006 | Balin | G01F 23/2962 |
| | | | | 73/290 V |
| 7,007,545 | B1 * | 3/2006 | Martinek | G01M 3/243 |
| | | | | 73/40.5 A |
| 7,406,865 | B2 * | 8/2008 | Klees | G01F 23/284 |
| | | | | 73/304 R |
| 7,418,860 | B2 * | 9/2008 | Austerlitz | G01F 23/2961 |
| | | | | 73/290 V |
| 7,423,931 | B2 * | 9/2008 | Martin, II | H04B 13/00 |
| | | | | 340/870.01 |
| 7,607,347 | B2 * | 10/2009 | Dockendorff | G01F 23/2961 |
| | | | | 73/290 V |
| 7,668,670 | B2 * | 2/2010 | Lander | G01M 3/243 |
| | | | | 340/605 |
| 7,891,229 | B2 * | 2/2011 | Sai | G01F 23/284 |
| | | | | 73/1.73 |
| 8,018,373 | B2 * | 9/2011 | Edvardsson | G01F 23/284 |
| | | | | 342/118 |
| 8,261,776 | B2 * | 9/2012 | Catron | G05D 7/0635 |
| | | | | 137/2 |
| 8,646,328 | B2 * | 2/2014 | Knowles | G01F 23/2961 |
| | | | | 73/290 V |
| 8,665,101 | B2 * | 3/2014 | Solomon | G01M 3/243 |
| | | | | 340/605 |
| 8,701,483 | B2 * | 4/2014 | Welle | G01F 23/284 |
| | | | | 73/290 R |
| 9,291,492 | B2 * | 3/2016 | Fredriksson | G01F 23/284 |
| 9,395,228 | B2 * | 7/2016 | Molitor | G01F 23/2961 |
| 9,897,477 | B2 * | 2/2018 | Maguin | F01N 3/2066 |
| 10,037,752 | B1 * | 7/2018 | Colasante | G10K 9/18 |
| 10,132,823 | B2 * | 11/2018 | Giunta | G01S 5/22 |
| 10,209,225 | B2 * | 2/2019 | Perrier | G01M 3/00 |
| 2005/0017896 | A1 * | 1/2005 | Klofer | G01F 23/284 |
| | | | | 342/124 |
| 2006/0090563 | A1 * | 5/2006 | Austerlitz | G01F 23/2961 |
| | | | | 73/290 V |
| 2009/0250125 | A1 * | 10/2009 | Howitt | E03F 7/00 |
| | | | | 137/551 |
| 2011/0161037 | A1 * | 6/2011 | Sutherland | F16L 55/48 |
| | | | | 702/103 |
| 2015/0300907 | A1 * | 10/2015 | Giunta | G01M 3/243 |
| | | | | 702/39 |
| 2016/0290974 | A1 * | 10/2016 | Coleman | G01N 29/04 |
| 2016/0370325 | A1 * | 12/2016 | Yusuf | G01N 29/032 |
| 2018/0306755 | A1 * | 10/2018 | Perrier | G01M 3/00 |

FOREIGN PATENT DOCUMENTS

| | | |
|---|---|---|
| JP | 10-339722 A | 12/1998 |
| JP | 11-132831 A | 5/1999 |
| JP | 2014-206504 A | 10/2014 |
| JP | 2015-010878 A | 1/2015 |
| SU | 498496 A * | 3/1976 |

* cited by examiner

LIQUID SURFACE POSITION DETECTION DEVICE

CROSS REFERENCE

This application is the U.S. National Phase under 35 U.S.C. § 371 of International Application No. PCT/JP2016/057891, filed on Mar. 14, 2016, which claims the benefit of Japanese Application No. 2015-068785, filed on Mar. 30, 2015, the entire contents are hereby incorporated by reference.

TECHNICAL FIELD

The present invention relates to a liquid surface position detection device for detecting a liquid surface of a liquid in a tank using ultrasonic waves.

BACKGROUND ART

Examples of liquid surface position detection devices may include a device for detecting a liquid surface position using a float floating on a liquid surface in a tank, and a device in which an ultrasonic wave propagation body is disposed in a tank and a liquid surface position is detected using a difference between the speed of surface waves propagating through the liquid and the speed of surface waves propagating through the gas. Various types of liquid surface position detection devices using ultrasonic waves have been proposed (for example, see Patent Literature 1 (FIG. 1)).

In the liquid surface position detection device of Patent Literature 1, a metal ultrasonic wave propagation body is disposed in a tank so that the longitudinal direction of the propagation body coincides with the vertical direction, and an ultrasonic vibrator provided at an upper end portion of the ultrasonic wave propagation body is vibrated. A liquid surface position is detected using a phenomenon that the speed of surface waves propagating through a liquid contacting portion is slower than the speed of surface waves propagating through an exposed portion exposed from the liquid. However, since the ultrasonic wave propagation body is made of metal, the speed of surface waves propagating through the liquid contacting portion and the speed of surface waves propagating through the exposed portion are substantially the same, whereby detection accuracy of the liquid surface position is lowered. To address this issue, a technology using a propagation body made of synthetic resin is proposed (for example, see Patent Literature 2 (FIGS. 1 and 2)).

In the liquid surface position detection device of Patent Literature 2, the propagation body made of synthetic resin is disposed in a tank so that the longitudinal direction of the propagation body coincides with the vertical direction. A piezoelectric element provided on an upper surface of the propagation body is vibrated to generate surface waves on a surface of the propagation body. Time until the surface waves reflected at a lower end of the propagation body returns to the piezoelectric element is measured. A liquid surface position is detected using a phenomenon that the speed of surface waves propagating through a liquid contacting portion is slower than the speed of surface waves propagating through an exposed portion exposed from the liquid. The piezoelectric element is disposed to be pressed against the upper surface of the propagation body by a fixing member.

However, since the propagation body is disposed in the tank in the liquid surface position detection devices of Patent Literature 1 and Patent Literature 2, there is a possibility that the liquid in the tank comes into contact with the piezoelectric element. Therefore, a technology for preventing a liquid from coming into contact with a piezoelectric element in a liquid surface position detection device in which a piezoelectric element is disposed at an upper end portion of a propagation body and a liquid surface is detected using ultrasonic waves is required.

CITATION LIST

Patent Literature

Patent Literature 1: JP-A-H04-86525
Patent Literature 2: JP-A-2015-10878

SUMMARY OF THE INVENTION

Problems to be Solved by the Invention

An object of the present invention is to provide a technology for preventing a liquid from coming into contact with a piezoelectric element in a liquid surface position detection device in which a piezoelectric element is disposed at an upper end portion of a propagation body and a liquid surface is detected using ultrasonic waves.

In the claim 1 according to the present invention, a liquid surface position detection device, comprising:

a propagation body which is provided in a container so as to be immersed, in a liquid and through which surface waves propagate;

a vibration generation and detection means which includes a piezoelectric element which is provided in the propagation body, configured to apply vibrations to the propagation body, and configured to detect reflected surface waves; and a position detection means configured to calculate a liquid surface position by measuring reflection time of the surface waves from a signal detected by the piezoelectric element, wherein the propagation body is made of a resin material, and integrally includes, at the upper part thereof, an element accommodating part which accommodates the piezoelectric element, the element accommodating part includes a bottom surface part formed so that a portion thereof juts out of a main surface which forms a surface of the propagation body, and the piezoelectric element is disposed so that a portion thereof juts out of the main surface, and so as to apply vibrations to the main surface in a direction orthogonal to the main direction via the bottom surface part.

In the claim 2 according to the present invention, the element accommodating part includes a substrate accommodating part which is formed to communicate with an accommodation space of the element accommodating part, and which accommodates a circuit substrate, and the substrate accommodating part integrally includes a flange attached to the container.

In the claim 3 according to the present invention, the substrate accommodating part is provided separately from the element accommodating part and is made of a material different from that of the element accommodating part.

In the claim 4 according to the present invention, the element accommodating part, a spacer is disposed via an elastic member on the piezoelectric element, and the piezoelectric element is pressed against the surface part with the spacer being urged by a pressing member.

Effect of the Invention

In the invention according to claim 1, since the element accommodating part which accommodates the piezoelectric element is provided integrally at an upper part of the propagation body, vibrations of the piezoelectric element can be applied to the propagation body, and the piezoelectric element can be disposed in the sealed space of the element accommodating part, whereby the liquid can be prevented from coming into contact with the piezoelectric element. Since the bottom surface part is formed so that a portion thereof juts out of a main surface and the piezoelectric element is disposed so that a portion thereof juts out of the main surface, surface waves can desirably be generated. Further, since the propagation body is made of a resin material, a difference between the speed of the surface waves propagating through a liquid contacting portion and the speed of the surface waves propagating through an exposed portion can be increased, whereby detection accuracy of the liquid surface can be increased.

In the invention according to claim 2, since a flange attached to a container is integrally formed in the substrate accommodating part which accommodates a circuit substrate, the liquid in the container can be prevented from entering in the substrate accommodating part, whereby the circuit; substrate can be waterproofed.

In the invention according to claim 3, the substrate accommodating part is provided separately from the element accommodating part and is made of a material different from that of the element accommodating part. Therefore, for example, since polyphenylenesulfide (PPS) is used as the material of the propagation body and polyacetal (POM) is used as the material of the substrate accommodating part and the flange, the material of the substrate accommodating part and the flange can be cheaper and tougher than the material of the element accommodating part. Therefore, the entire device can be cheaper and the attaching strength to the container can be increased.

In the invention according to claim 4, in the element accommodating part, a spacer is disposed via an elastic member on the piezoelectric element. Since the piezoelectric element is pressed against the bottom surface part with the spacer being urged by the pressing member, an accuracy error of an attaching portion of the piezoelectric element caused by a temperature change of an ambient environment can be absorbed, and the piezoelectric element can be pressed against the bottom surface part without a gap. Therefore, even if the temperature of the ambient environment changes, the surface waves from the propagation body can be detected by the piezoelectric element, and detection accuracy of the liquid surface position can be increased.

MODE FOR CARRYING OUT THE INVENTION

Hereinafter, an embodiment of the present invention will be described with reference to the accompanying drawings.

Embodiment

Figure 1:
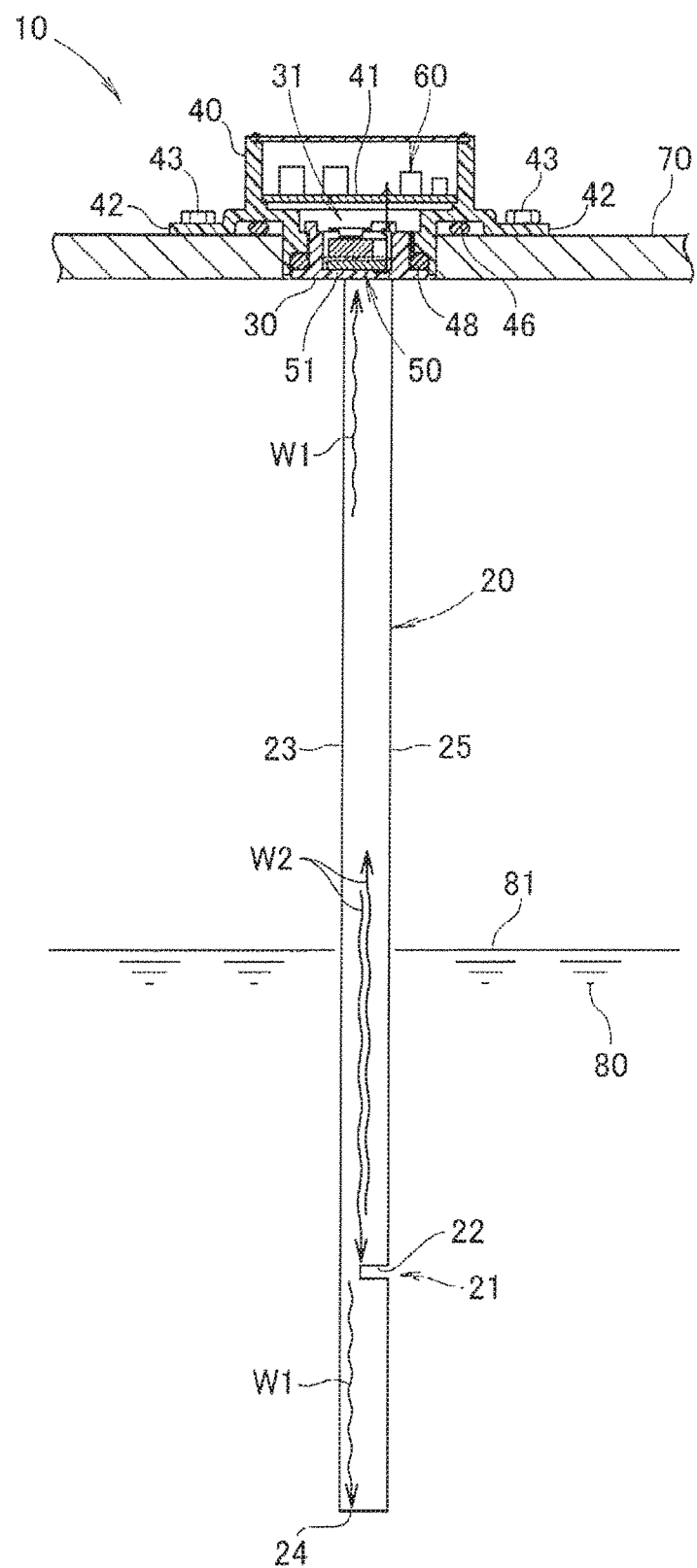
FIG. 1 is a configuration diagram of a liquid surface position detection device in accordance with the present invention.

As illustrated in FIG. 1, a liquid surface position detection device 10 is a device for detecting a position of a liquid surface 81 of a liquid 80 contained in a container 70. The container 70 is a fuel tank, for example, and the liquid 80 is gasoline, for example. Upon usage and supply of gasoline, the position of the liquid surface 81 is moved up and down. The container 70 is not limited to a fuel tank, but may be any common container that contains the liquid 80. The liquid 80 is not limited to gasoline, but may be any liquid, such as fuel like alcohol, and water.

The liquid surface position detection device 10 includes a propagation body 20 which is provided to be immersed in the liquid 80 and through which ultrasonic waves propagate, a vibration generation and detection means 50 which includes a piezoelectric element 51 which is provided in the propagation body 20, configured to apply vibrations to the propagation body 20, and configured to detect reflected ultrasonic waves, and a position detection means 60 which calculates a liquid surface position by measuring reflection time of the ultrasonic waves from a signal detected by the piezoelectric element 51.

An element accommodating part 30 which accommodates the piezoelectric element 51 is provided at an upper end portion of the propagation body 20. The element accommodating part 30 includes a substrate accommodating part 40 which is formed to communicate with an accommodation space 31 of the element accommodating part 30 and which accommodates a circuit substrate 41. The substrate accommodating part 40 integrally includes a flange 42, and the flange 42 is fastened to the container 70 by a fastening member 43.

The propagation body 20 is made of a resin material. The resin material is polyphenylenesulfide (PPS), for example. Since the propagation body 20 is made of PPS, ultrasonic waves (surface waves W1 and internal propagation waves W2) are made to propagate desirably. The resin material is not limited to PPS, and other common resin through which ultrasonic waves propagate may also be used.

The propagation body 20 has a vertically elongated square column shape, and has a cutout groove 21 in the middle. The groove 21 includes an internal propagation wave reflecting part 22 which reflects internal propagation waves. Although the propagation body 20 has a square column shape in the embodiment, the shape is not limited to the same, and other vertically elongated shapes, such as a cylindrical column shape and a triangular column shape, may also be employed.

The vibration generation and detection means 50 is constituted by the piezoelectric element 51, a circuit which transmits a signal for driving the piezoelectric element 51, and a circuit for receiving the signal detected by the piezoelectric element. These circuits are mounted on the circuit substrate 41.

In order to generate the surface waves W1 and the internal propagation waves W2 in the propagation body 20 and detect the surface waves W1 and the internal propagation waves W2, the piezoelectric element 51 is disposed so that a portion thereof juts out of a main surface 23 of a surface of the propagation body 20 on which the groove 21 is not provided to the end (including the surface itself and an area to a predetermined depth from the surface shorter than a thickness of the propagation body 20). The piezoelectric element 51 applies vibrations to the propagation body 20, generates the surface waves W1 on the main surface 23 of the propagation body 20, and generates the internal propagation waves W2 inside of the propagation body 20. Further, the piezoelectric element 51 detects the surface waves W1 reflected on a lower end 24 of the main surface 23 and the internal propagation waves W2 reflected on the internal propagation wave reflecting part 22, and converts the reflected waves into voltages. The surface waves W1 may be Rayleigh waves, leaky Rayleigh waves, and shear horizontal surface acoustic waves (SH-SAW), and the internal propagation waves W2 may be transverse waves.

In vibration generation, a voltage is applied to the piezoelectric element 51 of the vibration generation and detection means 50 by a driving signal output from the position detection means 60 at a predetermined period, and the piezoelectric element 51 is driven. Therefore, the surface waves W1 and the internal propagation waves W2 described above are generated.

In vibration detection, an output signal is output from the piezoelectric element 51 based on the reflected surface waves W1 and the reflected internal propagation waves W2. Therefore, the output signal is transmitted to the position detection means 60, and the position of the liquid surface is calculated.

Although the position detection means 60 is a circuit mounted on the circuit substrate 41 in the embodiment, the position detection means 60 is not limited to the same. The position detection means 60 may be provided in an external device disposed in an outside of the substrate accommodating part 40.

Next, a basic principle of calculation of a height of the liquid surface 81 will be described. In summary, the height of the liquid surface 81 is obtained from propagation time T1 of the surface waves W1 and propagation time T2 of the internal propagation waves W2. Hereinafter, detailed description will be given.

The propagation time T1 of the surface waves W1 is a time period from time t1 at which the position detection means 60 outputs a driving signal until time t2 at which the position detection means 60 receives the output signal after the surface waves W1 are generated and the surface waves W1 reflected on the lower end 24 of the propagation body 20 are detected by the piezoelectric element 51.

The propagation time T2 of the internal propagation waves W2 is a time period from time t1 at which the position detection means 60 outputs a driving signal until time t3 at which the position detection means 60 receives the output signal after the internal propagation waves W2 are generated and the internal propagation waves W2 reflected on the internal propagation wave reflecting part 22 of the propagation body 20 are detected by the piezoelectric element 51.

In a portion in which the propagation body 20 is immersed in the liquid 80, the speed at which the surface waves W1 travel in the propagation body 20 (the main surface 23) is slower. Therefore, the higher the liquid surface in the container 70, the larger T1 becomes. Since the internal propagation waves W2 travel inside of the propagation body 20, a value of T2 is determined without being affected by the portion of the propagation body 20 which is immersed in the liquid 80.

A temperature of the propagation body 20 is obtained from the propagation time T2 of the internal propagation waves W2 with reference to temperature conditions stored in memory of the position detection means 60, for example. Based on the temperature of the propagation body 20, a temperature correction, of the propagation time T1 of the surface waves W1 is performed. The height of the liquid surface 81 is calculated from the value for which the temperature correction of the propagation time T1 is performed with reference to information stored in the memory of the position detection means 60, for example. Although reference is not made to an expression for the temperature correction in the embodiment, a temperature correction here is performed through calculation by the position detection means 60 in consideration of a predetermined correction coefficient, for example.

Figure 2:
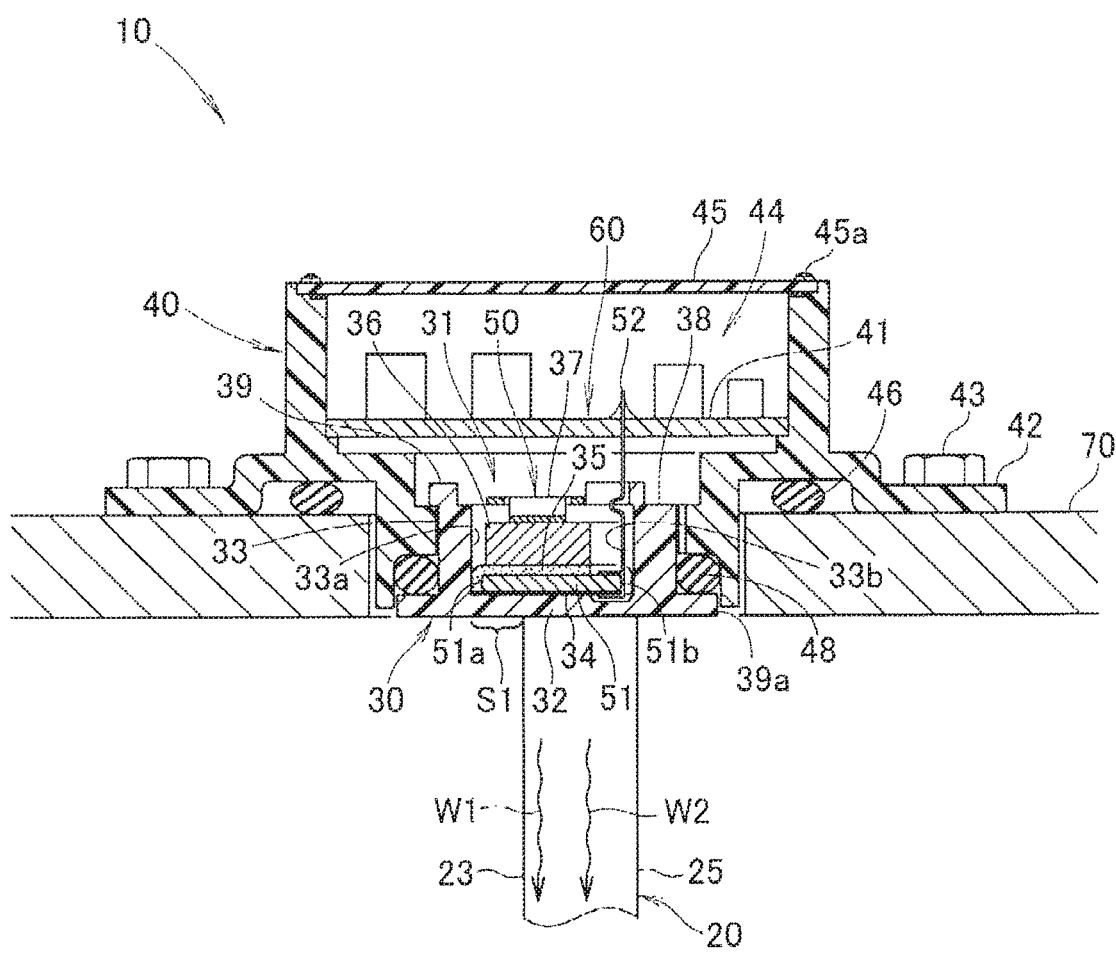
FIG. 2 is a cross-sectional view of a main part of the liquid level detection device.
Figure 3:
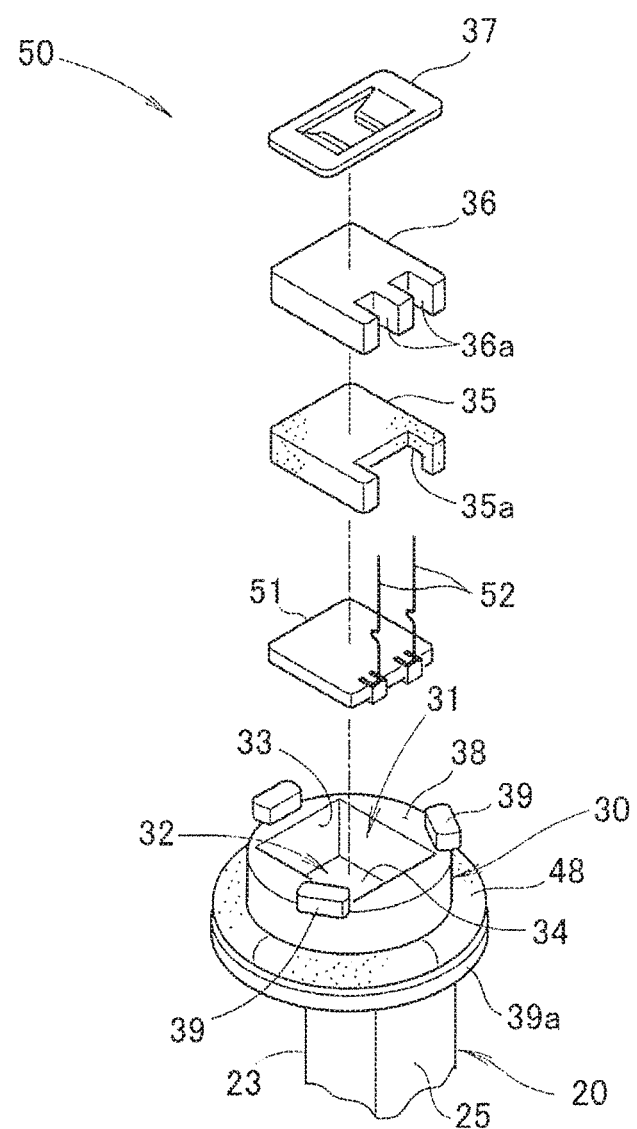
FIG. 3 is an exploded perspective view of the main part of the liquid level detection device.
Figure 4:
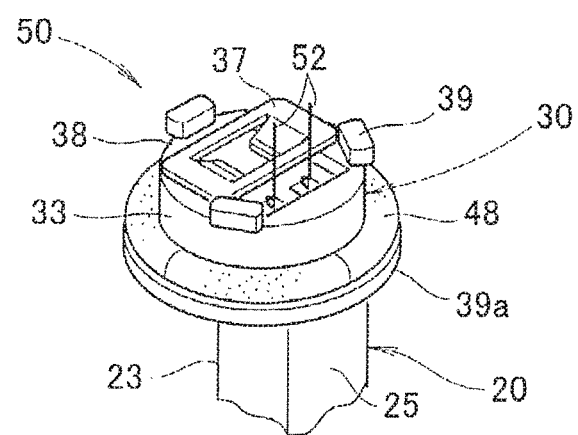
FIG. 4 is a perspective view of the main part of the liquid level detection device.

Next, a main part of the liquid surface position detection device 10 will be described. As illustrated in FIGS. 2 to 4, the liquid surface position detection device 10 includes the vertically elongated propagation body 20, the element accommodating part 30 in which the piezoelectric element 51 is accommodated, and the substrate accommodating part 40 in which the circuit substrate 41 is accommodated.

The propagation body 20 integrally includes the element accommodating part 30 at an upper part thereof. The element accommodating part 30 includes a bottom surface part 32 formed so that a portion thereof juts out of the main surface 23 of the propagation body 20 when seen in a side view, and a wall part 33 provided to extend in the orthogonal direction from the bottom surface part 32. The piezoelectric element 51 is disposed so that a portion thereof juts out of the main surface 23 when seen in a side view, and is in close contact with an upper surface of the bottom surface part 32 to apply vibrations to the main surface 23 in the orthogonal direction of the main surface via the bottom surface part 32.

A wall part 33a of the wall part 33 on the jutting side is positioned outside (on the left side in the drawings) of the main surface 23. A wall part 33b of the wall part 33 on the side opposite to the jutting side is positioned inside (on the left side in the drawings) of a back surface 25 of the propagation body 20 on the opposite side of the main surface 23. An end portion 51a of the piezoelectric element 51 on the jutting side is positioned outside (on the left side in the drawings) of the main surface 23. An end portion 51b of the piezoelectric element 51 on the side opposite to the jutting side is positioned inside (on the left side in the drawings) of the back surface 25 on the opposite side. By disposing the end portion 51b of the piezoelectric element 51 so as not to jut out of the back surface 25, generation of surface waves which become noise on the back surface 25 is prevented, whereby the surface waves W1 can desirably be generated only on the main surface 23 side. If the end portion 51b of the piezoelectric element 51 is disposed so as not to jut out of the back surface 25, the wall part 33b of the wall part 33 on the side opposite to the jutting side may be positioned outside (on the right in the drawings) of the back surface 25 of the propagation body 20.

The bottom surface part 32 and the piezoelectric element 51 include an area S1 of which portion juts out of the main surface 23. Therefore, a central portion of the piezoelectric element 51 can be disposed on an extension line of the main surface 23, and the surface waves W1 can desirably be generated. Further, since the propagation body 20 is made of a resin material, a difference between the speed of the surface waves W1 propagating through a liquid contacting portion and the speed of the surface waves W1 propagating through an exposed portion can be increased, whereby detection accuracy of the liquid surface 81 (see FIG. 1) can be increased.

The piezoelectric element 51 consists of a sliding element which vibrates in the orthogonal direction with respect to the main surface 23, for example. Vibrations of the piezoelectric element 51 are applied to the main surface 23 of the propagation body 20 via the bottom surface part 32, and the surface waves W1 are generated on the main surface 23. The internal propagation waves W2 are generated inside of the propagation body 20, The piezoelectric element 51 also functions as a detection unit which detects the surface waves W1 reflected on the lower end 24 of the main surface 23 (see FIG. 1) and the internal propagation waves W2 reflected on the internal propagation wave reflecting part 22 (see FIG. 1).

Since the element accommodating part 30 is provided integrally at an upper part of the propagation body 20, the piezoelectric element 51 is disposed in the sealed accommodation space 31 of the element accommodating part 30, whereby the liquid can be prevented from coming into contact with the piezoelectric element 51.

In the accommodation space 31 of the element accommodating part 30, an interference member 34 consisting of oil, grease, adhesive, and so forth for blocking an air layer is provided on the upper surface of the bottom surface part 32, the piezoelectric element 51 is provided on the interference member 34, an elastic member 35, such as rubber, is provided to cover the piezoelectric element 51, and a spacer 36 is provided on the elastic member 35. The spacer 36 is urged against the piezoelectric element 51 by a pressing member 37.

The pressing member 37 is a leaf spring member and is bonded to an upper part 38 of the element accommodating part 30. The method for fixing the pressing member 37 to the element accommodating part 30 is not limited to bonding, but may be screwing or hooking. The pressing member 37 is not limited to the leaf spring member, but may be any other elastic member, such as coil spring and torsion spring, which can press the spacer 36.

A vibration surface of the piezoelectric element 51 is in contact with an upper surface of the propagation body 20 (a bottom surface part 32 of the element accommodating part 30). The piezoelectric element 51 can be uniformly pressed by not pressing the elastic member 35 directly with the pressing member 37 but pressing the spacer 36 disposed therebetween.

Since the piezoelectric element 51 is pressed against the bottom surface part 32 with the spacer 36 being urged by the pressing member 37, an accuracy error of an attaching portion of the piezoelectric element 51 caused by a temperature change of an ambient environment can be absorbed, and the piezoelectric element 51 can be pressed against the bottom surface part 32 without a gap. Therefore, even if the temperature of the ambient environment changes, the surface waves W1 from the propagation body 20 can be detected by the piezoelectric element 51, and detection accuracy of the liquid surface position can be increased.

The vibration generation and detection means 50 includes the piezoelectric element 51 and a circuit substrate 41 on which a transmission circuit and a reception circuit which are not illustrated are mounted, and a lead pin 52 extending from the piezoelectric element 51 is connected to the circuit substrate 41. A cut 35a is formed in the elastic member 35 to avoid interference with the lead pin 52, and a cut 36a is formed in the spacer 36 to avoid interference with the lead pin 52.

The substrate accommodating part 40 is made of a resin material. The resin material is polyacetal (POM), for example. Since polyacetal (POM) is used as the material of the substrate accommodating part 40 and the flange 42, the material of the substrate accommodating part 40 and the flange 42 can be cheaper and tougher than the material of the element accommodating part 30. Therefore, the entire device can be cheaper and the attaching strength to the container 70 can be increased.

The substrate accommodating part 40 communicates with the accommodation space 31 of the element accommodating part 30, and includes an accommodation space 44 for accommodating the circuit substrate 41. An opening of the substrate accommodating part 40 is covered with a cover member 45 via a sealing member which is not illustrated. Therefore, the opening of the element accommodating part 30 is also closely sealed with the cover member 45. The cover member 45 is fastened to the substrate accommodating part 40 by a fastening member 45a. The cover member 45 may also be bonded to the substrate accommodating part 40.

A space between an upper surface of the container 70 and the substrate accommodating part 40 is sealed with a sealing member 46. Although the sealing member 46 is an O-ring, other member which can seal may also be used. Lock pieces 39 are provided at the upper part 38 of the element accommodating part 30.

Figure 5:
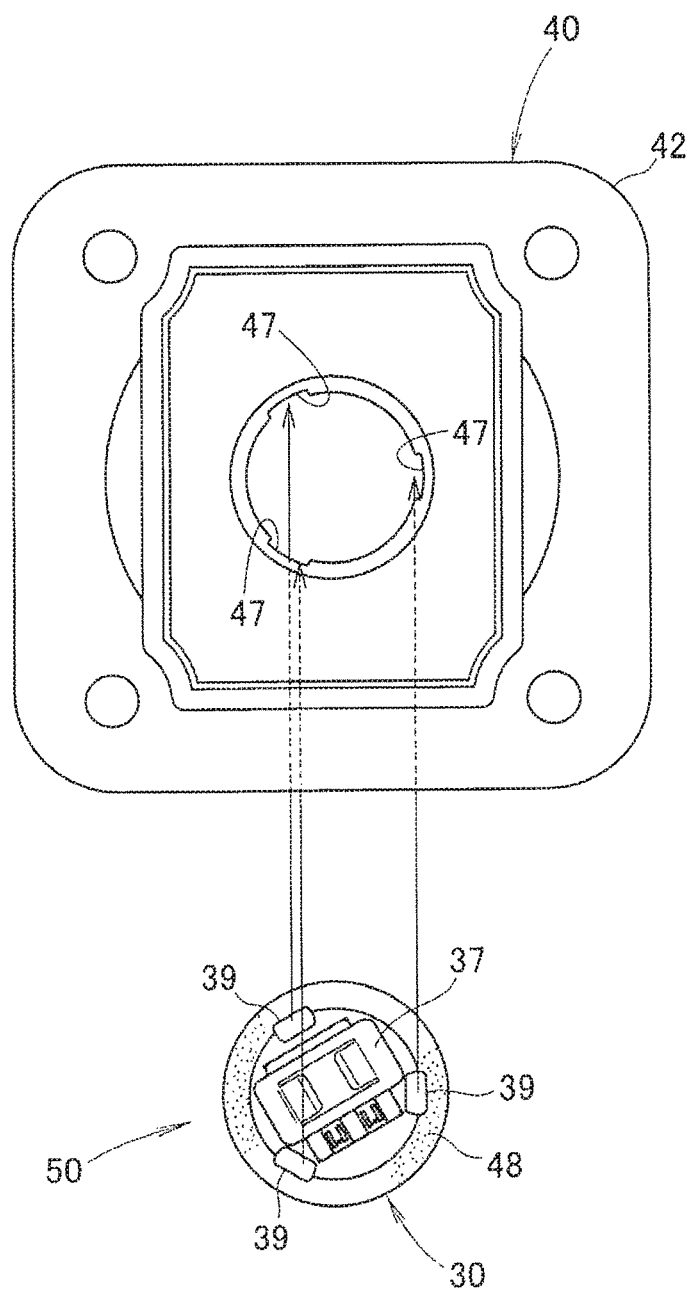
FIG. 5 is an explanatory view of assembling a propagation body and an element accommodating part to a substrate accommodating part.

As illustrated in FIGS. 2 and 5, cut portions 47 for assembly are formed in the substrate accommodating part 40. The element accommodating part 30 is assembled to the substrate accommodating part 40 with the lock pieces 39 of the element accommodating part 30 being passed through the cut portions 47 for assembly and rotated. A flange portion 39a is formed at a lower part of the element accommodating part 30, and a space between the flange portion 39a and the substrate accommodating part 40 is sealed with a sealing member 48. The sealing member 48 is an O-ring. The substrate accommodating part 40 is pinched between and fixed by the lock pieces 39 and the O-ring 48.

The element accommodating part 30 for disposing the piezoelectric element 51 is formed integrally with the propagation body 20, the element accommodating part 30 is provided with the substrate accommodating part 40 for accommodating the circuit substrate 41 via the sealing member 48, and the opening of the substrate accommodating part 40 is covered by the cover member 45. Therefore, the piezoelectric element 51 is disposed in the sealed accommodation space 31 of the element accommodating part 30, whereby airtightness can be secured, and the liquid can be prevented from coming into contact with the piezoelectric element 51 and the circuit substrate 41.

Although the substrate accommodating part 40 is provided separately from the element accommodating part 30 in the embodiment, the substrate accommodating part 40 may be integrally formed with the element accommodating part 30. Although the propagation body 20, the element accommodating part 30, and the substrate accommodating part 40 are attached to the container 70 from above in the embodiment, the propagation body 20, the element accommodating part 30, and the substrate accommodating part 40 may be attached from a bottom surface of the container 70 in the reverse order. In that case, the same effect can be obtained.

INDUSTRIAL APPLICABILITY

The present invention is suitable for a liquid surface position detection device which measures a liquid surface position of a liquid contained in a container.

DESCRIPTION OF REFERENCE NUMERALS

10 liquid surface position detection device
20 propagation body
23 main surface
30 element accommodating part
32 bottom surface part
35 elastic member
36 spacer
37 pressing member
40 substrate accommodating part
42 flange
50 vibration generation and detection means
51 piezoelectric element
60 position detection means
70 container
80 liquid
81 liquid surface

The invention claimed is:

1. A liquid surface position detection device, comprising:
a propagation body which is provided in a container so as to be immersed in a liquid and through which surface waves propagate;
a vibration generation and detection means which includes a piezoelectric element which is provided in the propagation body, configured to apply vibrations to the propagation body, and configured to detect reflected surface waves; and
a position detection means configured to calculate a liquid surface position by measuring reflection time of the surface waves from a signal detected by the piezoelectric element, wherein
the propagation body is made of a resin material, and integrally includes, at the upper part thereof, an element accommodating part which accommodates the piezoelectric element,
the element accommodating part includes a bottom surface part formed so that a portion thereof juts out of a main surface which forms a surface of the propagation body, and
the piezoelectric element is disposed so that a portion thereof juts out of the main surface, and so as to apply vibrations to the main surface in a direction orthogonal to the main direction via the bottom surface part.

2. The liquid surface position detection device according to claim 1, wherein
the element accommodating part, a spacer is disposed via an elastic member on the piezoelectric element, and
the piezoelectric element is pressed against the bottom surface part with the spacer being urged by a pressing member.

3. The liquid surface position detection device according to claim 1, wherein
the element accommodating part includes a substrate accommodating part which is formed to communicate with an accommodation space of the element accommodating part, and which accommodates a circuit substrate, and
the substrate accommodating part integrally includes a flange attached to the container.

4. The liquid surface position detection device according to claim 3, wherein
the element accommodating part, a spacer is disposed via an elastic member on the piezoelectric element, and
the piezoelectric element is pressed against the bottom surface part with the spacer being urged by a pressing member.

5. The liquid surface position detection device according to claim 3, wherein the substrate accommodating part is provided separately from the element accommodating part and is made of a material different from that of the element accommodating part.

6. The liquid surface position detection device according to claim 5, wherein
the element accommodating part, a spacer is disposed via an elastic member on the piezoelectric element, and
the piezoelectric element is pressed against the bottom surface part with the spacer being urged by a pressing member.

* * * * *